United States Patent
Tsutsui

(10) Patent No.: US 10,127,478 B2
(45) Date of Patent: Nov. 13, 2018

(54) ELECTRONIC APPARATUS AND METHOD

(71) Applicant: Kabushiki Kaisha Toshiba, Minato-ku, Tokyo (JP)

(72) Inventor: Hideki Tsutsui, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 60 days.

(21) Appl. No.: 15/270,772

(22) Filed: Sep. 20, 2016

(65) Prior Publication Data
US 2017/0091596 A1 Mar. 30, 2017

(30) Foreign Application Priority Data
Sep. 24, 2015 (JP) ................................. 2015-186801

(51) Int. Cl.
*G06K 9/00* (2006.01)
*G06K 9/72* (2006.01)
*G06F 17/27* (2006.01)

(52) U.S. Cl.
CPC .............. *G06K 9/72* (2013.01); *G06F 17/275* (2013.01); *G06F 17/2735* (2013.01); *G06F 17/2765* (2013.01); *G06K 2209/011* (2013.01)

(58) Field of Classification Search
CPC ................ G06K 9/72; G06K 2209/011; G06F 17/2735; G06F 17/275; G06F 17/2765
See application file for complete search history.

(56) References Cited

U.S. PATENT DOCUMENTS

| | | | | |
|---|---|---|---|---|
| 6,047,251 A | * | 4/2000 | Pon | G06K 9/6807 382/229 |
| 6,157,905 A | * | 12/2000 | Powell | G06F 17/2217 704/2 |
| 6,567,547 B1 | * | 5/2003 | Roman | G06K 9/6821 382/181 |
| 7,162,086 B2 | * | 1/2007 | Ikeda | G06K 9/6821 382/182 |
| 7,546,524 B1 | * | 6/2009 | Bryar | G06F 3/04883 715/230 |
| 8,385,652 B2 | * | 2/2013 | Mitic | G06K 9/342 382/177 |
| 9,141,607 B1 | * | 9/2015 | Lee | G06F 17/289 |

(Continued)

FOREIGN PATENT DOCUMENTS

| | | |
|---|---|---|
| JP | H09-218923 A | 8/1997 |
| JP | H10-124505 A | 5/1998 |
| JP | 2010-108087 A | 5/2010 |

*Primary Examiner* — John Strege
(74) *Attorney, Agent, or Firm* — Knobbe, Martens, Olson & Bear, LLP

(57) ABSTRACT

According to one embodiment, an electronic apparatus includes a hardware processor. The hardware processor converts a first character in a first image of images in which characters of languages are rendered, into a first character code by using dictionary data for a first language environment, converts the first character into a second character code by using dictionary data for a second language environment, causes a memory to store a pair of the first character code and a first area in the first image corresponding to the first character code, and causes the memory to store a pair of the second character code and a second area in the first image corresponding to the second character code.

7 Claims, 10 Drawing Sheets

(56) References Cited

U.S. PATENT DOCUMENTS

| | | | |
|---|---|---|---|
| 9,390,340 B2* | 7/2016 | Lin | G06K 9/18 |
| 9,411,801 B2* | 8/2016 | Osipova | G06F 17/276 |
| 9,798,943 B2* | 10/2017 | Collet | G06K 9/18 |
| 9,811,726 B2* | 11/2017 | Atroshchenko | G06K 9/00456 |
| 2004/0006467 A1* | 1/2004 | Anisimovich | G06K 9/6842 |
| | | | 704/251 |
| 2004/0117192 A1* | 6/2004 | Miletzki | B07C 3/14 |
| | | | 704/277 |
| 2011/0106805 A1* | 5/2011 | Bao | G06F 17/30017 |
| | | | 707/737 |
| 2014/0363082 A1* | 12/2014 | Dixon | G06K 9/00402 |
| | | | 382/187 |

\* cited by examiner

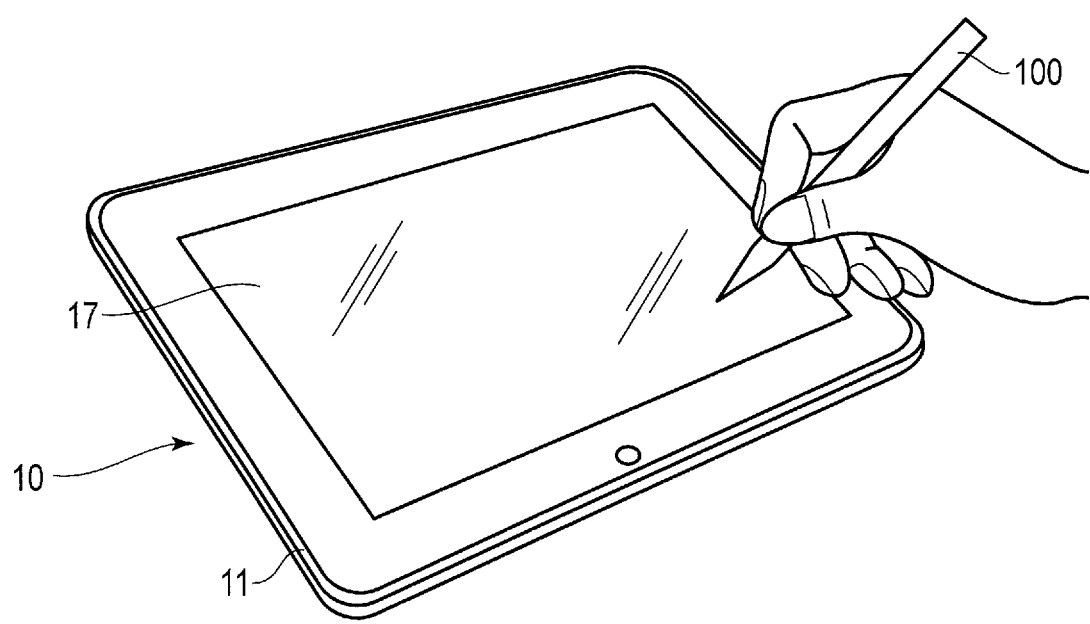
F I G. 1

| ID | Image ID | Dictionary | Characters | Area | ... | |
|---|---|---|---|---|---|---|
| 0001 | 0001 | Japanese | Hello | (x1,y1)-(x2,y2) | ... | —71 |
| 0002 | 0001 | Japanese | んみむ | (x3,y3)-(x4,y4) | ... | —72 |
| 0003 | 0001 | Japanese | こんにちは | (x5,y5)-(x6,y6) | ... | —73 |
| 0004 | 0001 | English | Hello | (x7,y7)-(x8,y8) | ... | —74 |
| 0005 | 0001 | English | World | (x9,y9)-(x10,y10) | ... | —75 |
| 0006 | 0001 | English | FhlEblF | (x11,y11)-(x12,y12) | ... | —76 |
| ⋮ | ⋮ | ⋮ | ⋮ | ⋮ | ⋮ | |

FIG. 5    42B

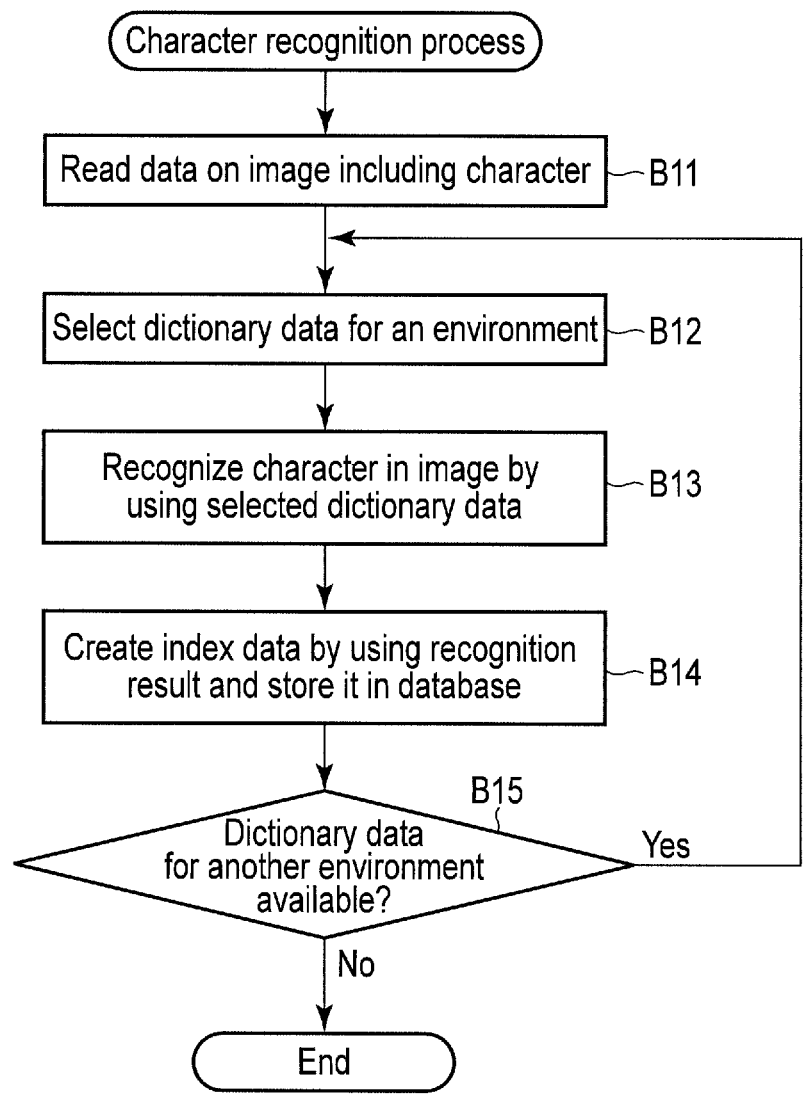
F I G. 11

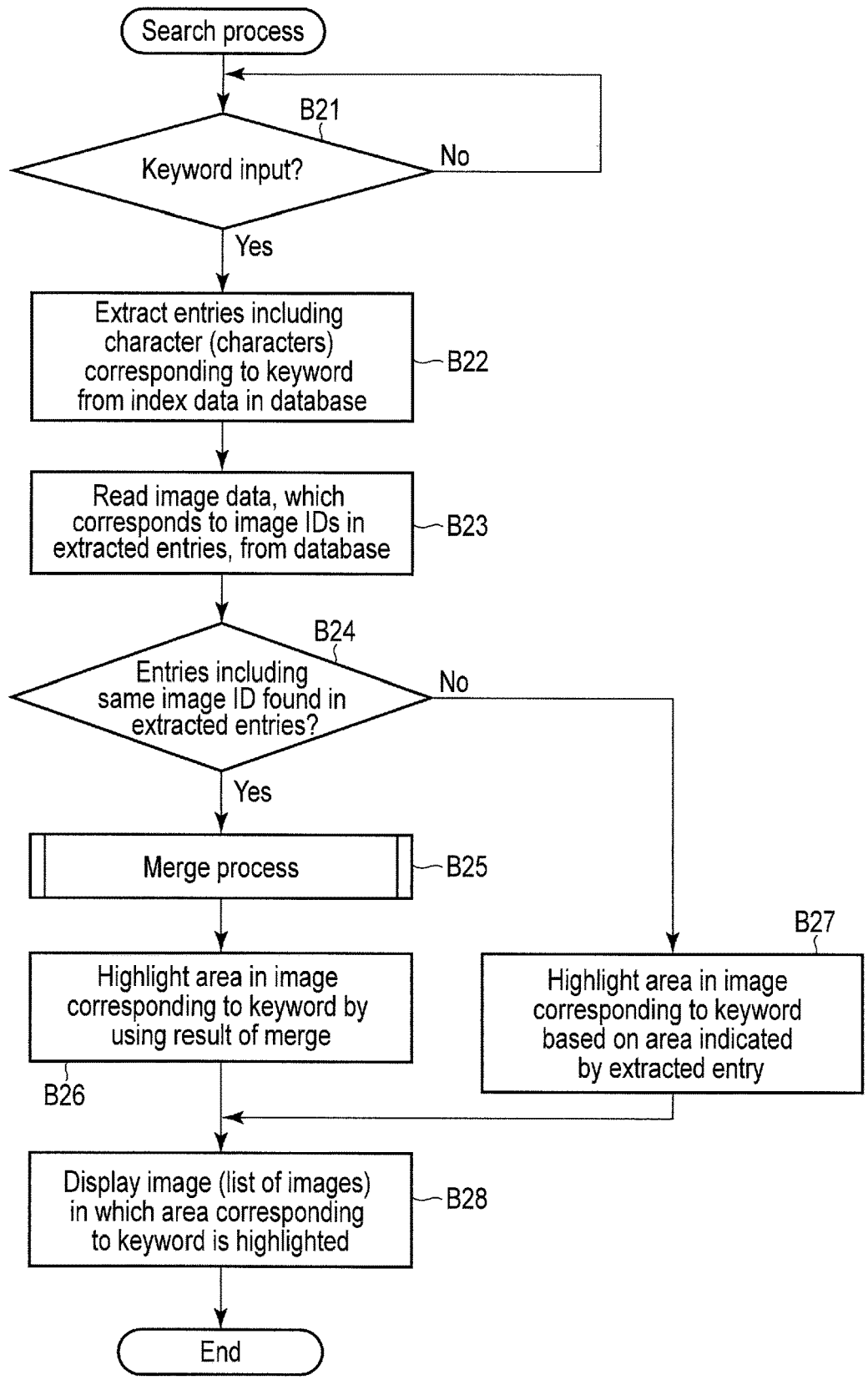
F I G. 12

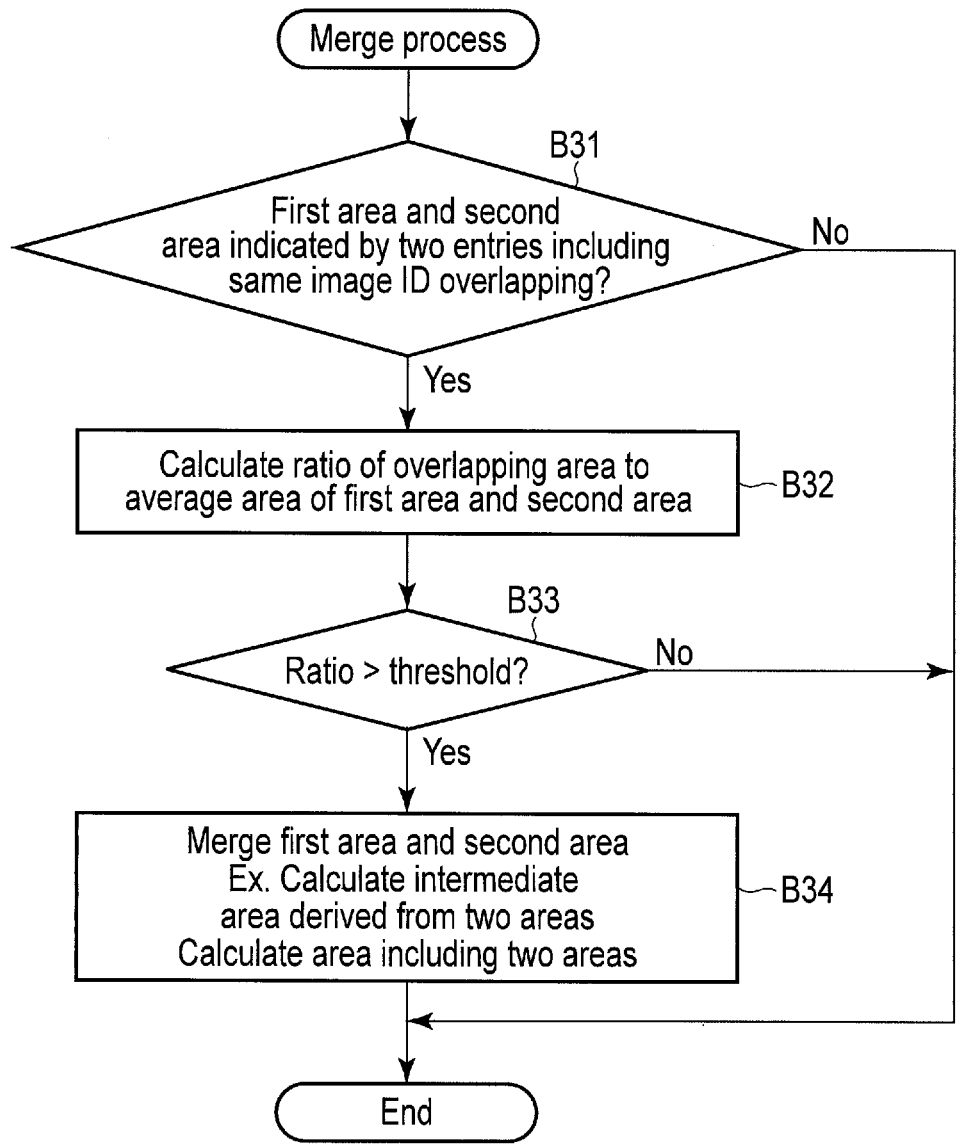
F I G. 13

ELECTRONIC APPARATUS AND METHOD

CROSS-REFERENCE TO RELATED APPLICATIONS

This application is based upon and claims the benefit of priority from Japanese Patent Application No. 2015-186801, filed Sep. 24, 2015, the entire contents of which are incorporated herein by reference.

FIELD

Embodiments described herein relate generally to technology of recognizing characters.

BACKGROUND

Optical character recognition (OCR) technology of creating image data by scanning pages of notebooks and paper materials, etc., and recognizing characters in such documents by using this image data has been utilized. This technology enables the characters in the image to be converted into text (character codes), and thus, editing of the text or searching based on the text can be carried out easily.

Meanwhile, characters in the image may include characters of multiple languages (writing systems). When a character recognition process is performed for such an image, the image may not be able to be searched by a keyword (a character string) since characters of an unexpected language cannot be correctly recognized. Accordingly, it is necessary to realize a new function whereby an image including characters of multiple languages can be searched by a keyword.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view showing an appearance of an electronic apparatus according to an embodiment.

FIG. 5 is a view showing an example of index data created by the electronic apparatus of the embodiment.

FIG. 11 is a flowchart showing an example of the procedure of a character recognition process executed by the electronic apparatus of the embodiment.

FIG. 12 is a flowchart showing an example of the procedure of a search process executed by the electronic apparatus of the embodiment.

FIG. 13 is a flowchart showing an example of the procedure of a merge process executed by the electronic apparatus of the embodiment.

DETAILED DESCRIPTION

Figure 2:
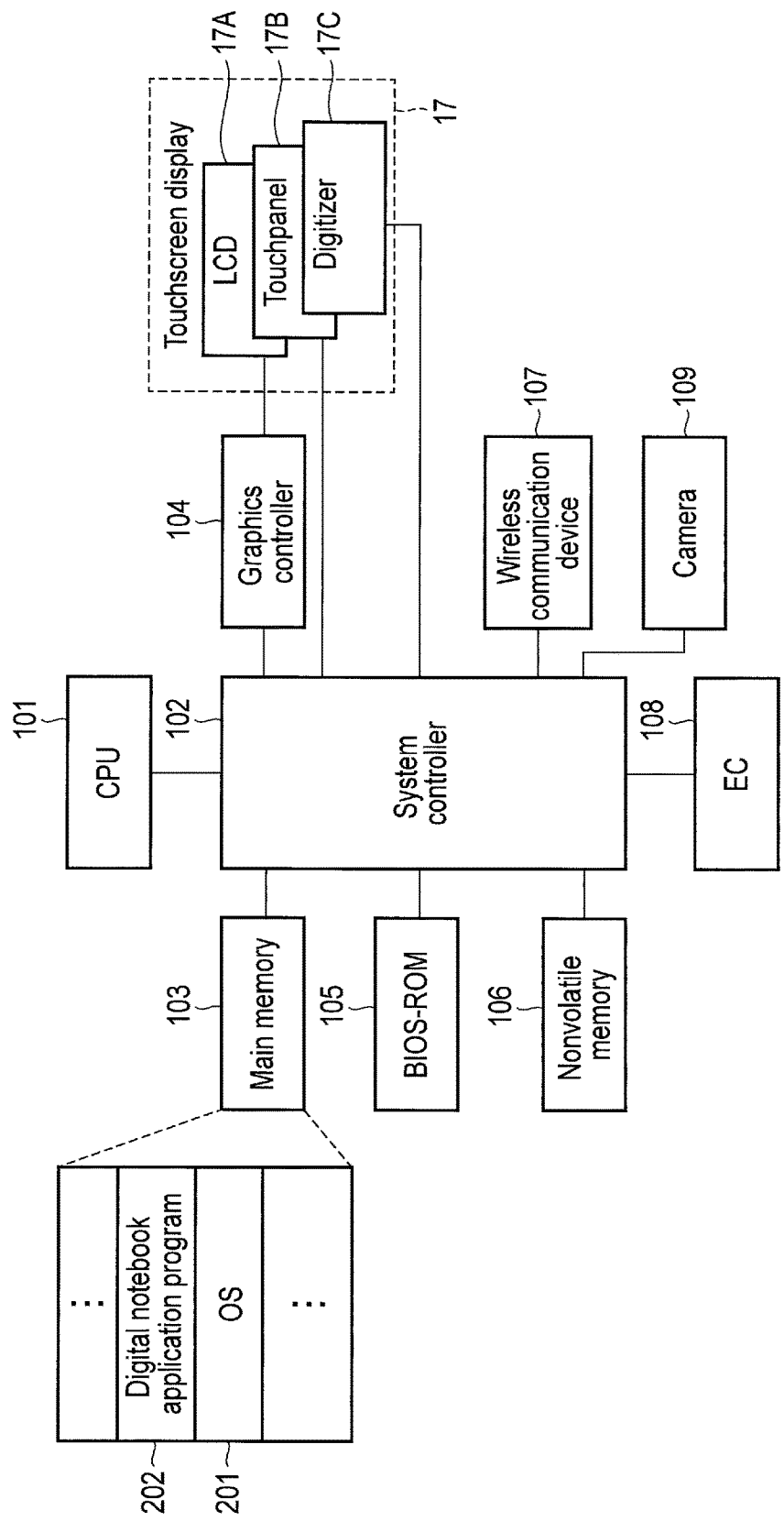
FIG. 2 is an exemplary block diagram showing a system configuration of the electronic apparatus of the embodiment.

Various embodiments will be described hereinafter with reference to the accompanying drawings.

In general, according to one embodiment, an electronic apparatus includes a memory and a hardware processor. The memory stores images in which characters of languages are rendered. The hardware processor is configured to: convert at least one first character in a first image of the images, into at least one first character code by using dictionary data for a first language environment; convert the at least one first character into at least one second character code by using dictionary data for a second language environment; cause the memory to store a pair of the at least one first character code and a first area in the first image corresponding to the at least one first character code; and cause the memory to store a pair of the at least one second character code and a second area in the first image corresponding to the at least one second character code.

FIG. 1 is a perspective view showing an appearance of an electronic apparatus according to an embodiment. The electronic apparatus is, for example, a portable electronic apparatus capable of inputting data by, for example, a stylus or a finger. The electronic apparatus can be implemented as a tablet computer, a notebook personal computer, a smartphone, a PDA, and the like. In the following descriptions, a case where the electronic apparatus is implemented as a tablet computer 10 is assumed. The tablet computer 10 is a portable electronic apparatus which may also be called a tablet or a slate computer, and includes a main body 11 and a touchscreen display 17, as shown in FIG. 1. The touchscreen display 17 is arranged to be laid over a top surface of the main body 11.

The main body 11 includes a thin box-shaped housing. A flat panel display and a sensor configured to detect a contact position of the stylus or the finger on a screen of the flat-panel display are incorporated in the touchscreen display 17. The flat-panel display may be, for example, a liquid crystal display (LCD). As the sensor, a capacitive touchpanel or an electromagnetic induction digitizer, for example, can be used. In the following descriptions, it is assumed that both two types of sensor, i.e., a digitizer and a touchpanel, are incorporated in the touchscreen display 17.

Each of the digitizer and the touchpanel is provided to cover the screen of the flat-panel display. The touchscreen display 17 can detect not only a touch operation on the screen using the finger, but also a touch operation on the screen using a stylus 100. The stylus 100 is, for example, an electromagnetic induction stylus.

The user can also perform a handwriting input operation of inputting strokes by handwriting, on the touchscreen display 17, by using an external object (the stylus 100 or the finger). During the handwriting input operation, a path of movement of the external object on the screen, that is, a path of a stroke handwritten by the handwriting input operation, is drawn in real time, whereby a path of each stroke is displayed on the screen. The path of the movement of the external object formed while the external object is in contact with the screen corresponds to one stroke. A set of a number of strokes, i.e., a set of a number of paths, constitute a handwritten character or figure.

FIG. 2 is a diagram showing a system configuration of the tablet computer 10.

As shown in FIG. 2, the tablet computer 10 includes a CPU 101, a system controller 102, a main memory 103, a graphics controller 104, a BIOS-ROM 105, a nonvolatile memory 106, a wireless communication device 107, an embedded controller (EC) 108, a camera 109, etc.

The CPU 101 is a hardware processor which controls the operation of various components in the tablet computer 10. The CPU 101 executes various kinds of software loaded into the main memory 103 from the nonvolatile memory 106, which is a storage device. The various kinds of software include an operating system (OS) 201, and various application programs. The application programs include a digital notebook application program 202. The digital notebook application program 202 includes document creation instructions. A document to be created includes, for example, a character input by means of a software keyboard, and a character or a figure input by handwriting through the touchscreen display 17. In such a document, an image stored in the nonvolatile memory 106, etc., an image received via a network, and an image created on the tablet computer 10 (for example, an image captured by using the camera 109, a captured image of a screen, an image created by using a paint application, etc.) can be pasted, and any such image can be treated as a document.

Further, the digital notebook application program 202 includes character recognition instructions for converting a character in an image or a handwritten character into text (a character code), and document search instructions for searching a document based on a keyword (a character string). When the CPU 101 executes digital notebook application program 202, the CPU 101 can search not only the character (character code) input by means of a software keyboard, but also the character in an image or the handwritten character converted into text (character code).

Further, the CPU 101 executes a Basic Input/Output System (BIOS) stored in the BIOS-ROM 105. The BIOS is a program for hardware control.

The system controller 102 is a device for connecting between a local bus of the CPU 101 and the various components. In the system controller 102, a memory controller, which exerts access control over the main memory 103, is also integrated. In addition, the system controller 102 has the function of communicating with the graphics controller 104 via a serial bus conforming to the PCI EXPRESS standard.

The graphics controller 104 is a display controller for controlling an LCD 17A which is used as a display monitor of the tablet computer 10. A display signal generated by the graphics controller 104 is transmitted to the LCD 17A. The LCD 17A displays a screen image based on the display signal. On the LCD 17A, a touchpanel 17B and a digitizer 17C are arranged. The touchpanel 17B is a capacitive pointing device configured to input data on the screen of the LCD 17A. A contact position on the screen touched by a finger, movement of the contact position, etc., are detected by the touchpanel 17B. The digitizer 17C is an electromagnetic induction pointing device configured to input data on the screen of the LCD 17A. A contact position on the screen touched by the stylus 100, movement of the contact position, a contact pressure, etc., are detected by the digitizer 17C.

The wireless communication device 107 is a device configured to execute wireless communication such as wireless LAN or 3G/4G/LTE mobile communication. The EC 108 is a single-chip microcomputer including an embedded controller for power management. The EC 108 has the function of powering on or off the tablet computer 10 in accordance with the power button operation by the user.

Incidentally, when characters in an image or handwritten characters are recognized, it is assumed that a language environment for recognition is determined in advance. For example, if it is specified that Japanese is used in the OS 201, etc., dictionary data for a Japanese environment is used for the character recognition. Also, for example, if it is specified that English is used in the OS 201, etc., dictionary data for an English environment is used for the character recognition.

However, an image may include characters of more than one language (for example, Japanese and English), and handwritten characters may also include handwritten characters of more than one language. If characters of more than one language in an image or handwritten characters of more than one language as described above are recognized by using dictionary data for a single language environment, the recognition accuracy is decreased, and thus, the accuracy in searching in the image or handwritten document by a keyword is also decreased.

It should be noted that a case where a user specifies a language environment (or language environments) for character recognition is also assumed. However, performing an operation to specify the language environment (or language environments) for character recognition by the user for each of the images or handwritten documents is very troublesome for the user.

Accordingly, when the CPU 101 executes the digital notebook application program 202, the CPU 101 recognizes characters in an image or handwritten characters by using more than one type of dictionary data for more than one language environment and causes the nonvolatile memory 106, etc. to store the result of recognition. By using this result of recognition, the CPU 101 can accurately search in the image or the handwritten document by a keyword (character string) regardless of the language to which the character in the image or the handwritten character corresponds.

Figure 3:
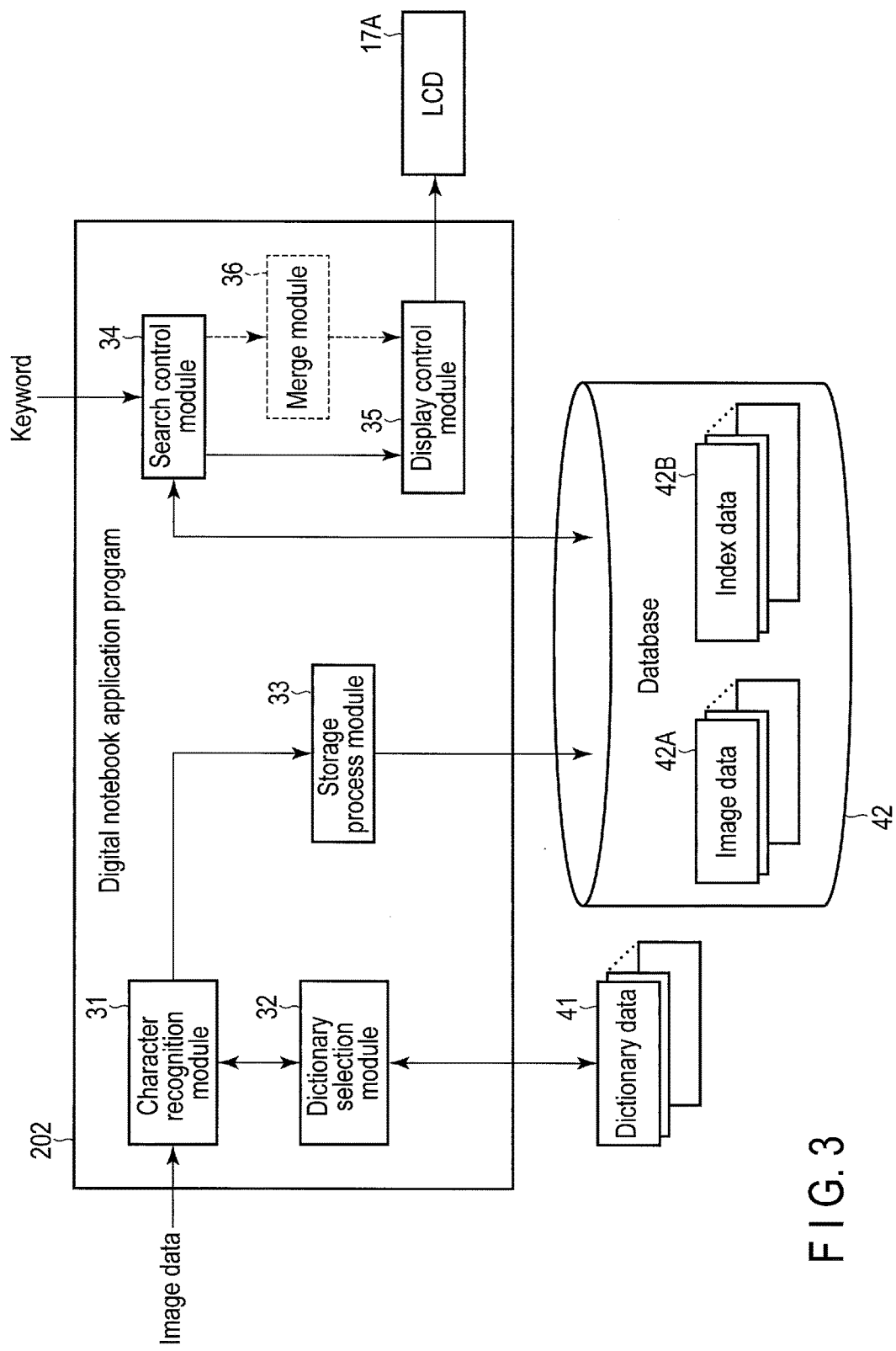
FIG. 3 is an exemplary block diagram showing a functional configuration of a digital notebook application program executed by the electronic apparatus of the embodiment.

FIG. 3 shows an example of a configuration of the digital notebook application program 202 executed by the tablet computer 10. The digital notebook application program 202 includes, for example, a character recognition module 31, a dictionary selection module 32, a storage process module 33, a search control module 34, a display control module 35, a merge module 36, etc. Note that in the following, in order to make the explanation easier to understand, a case where a character in the image is to be recognized and searched for will be described.

The image is, for example, an image based on image data 42A stored in a database 42. In the database 42, images in which characters of multiple languages are rendered are stored. These images include, for example, an image obtained by photographing or scanning a page of a book or a notebook, a material, a poster, a whiteboard, etc., and an image obtained by capturing a screen on which characters are displayed such as a screen displaying a web page or a document. The characters in these images may include characters of multiple languages, for example, hiragana for Japanese characters (the Japanese syllabary characters), and the alphabet for English characters.

The dictionary selection module 32 includes instructions for selecting items of dictionary data 41 for recognizing characters in the image. The dictionary selection module 32 may include instructions for selecting, for example, all items of dictionary data 41 stored in the nonvolatile memory 106, etc., or selecting items of dictionary data 41 based on a predetermined rule. The dictionary selection module 32 includes instructions for selecting, for example, dictionary data 41 for a language environment specified in the OS 201 (for example, dictionary data for the Japanese environment), and dictionary data 41 for a language environment corresponding to the other commonly-used language (for example, dictionary data for the English environment).

Dictionary data 41 includes character recognition dictionary data for character recognition. The character recognition dictionary data includes entries each including a character and a feature of that character. In addition, dictionary data 41 may include data on words and expression for recognizing a lump of characters.

Note that in the Japanese language environment, in addition to the Japanese characters including hiragana (the Japanese syllabary characters), katakana (angular Japanese syllabary characters used mainly for spelling out foreign words), kanji (Chinese characters), numerical characters, and symbols, characters of another language such as the alphabet, may also be used. Thus, the OS 201 and application programs, etc., are configured to handle all of these characters. For example, in a file (a document file, an image file, a web page file, etc.) handled in the Japanese language environment, in addition to hiragana, katakana, kanji, numerical characters, and symbols, which are the Japanese characters, characters of another language such as the alphabet are often used. For this reason, in dictionary data 41 for the Japanese environment, not only the entries corresponding to hiragana, katakana, kanji, numerical characters, and symbols, but also entries corresponding to characters of another language such as the alphabets are included.

Also, in the English environment, since the alphabets, numerals, symbols, etc., which are the English characters, are used, the OS 201 and the application programs, etc., are configured to handle these characters. For example, in a file handled in the English language environment, alphabets, numerals, symbols, and the like are often employed. Accordingly, dictionary data 41 for the English environment includes entries corresponding to alphabets, numerals and symbols.

The dictionary selection module 32 includes instructions for outputting each item of selected dictionary data 41 to the character recognition module 31.

The character recognition module 31 includes instructions for converting at least one first character in a first image, among images including characters of multiple languages, into at least one first character code by using dictionary data 41 for a first language environment, and converting the at least one first character into at least one second character code by using dictionary data 41 for a second language environment. The images are stored in, for example, the nonvolatile memory 106. The storage process module 33 includes instructions for causing the database 42 to store a pair of the at least one first character code and a first area in the first image corresponding to the first character code, and causing the database 42 to store a pair of the at least one second character code and a second area in the first image corresponding to the second character code.

Further, when at least one third character code is input by the user, and the first character code includes the third character code, or the second character code includes the third character code, the search control module 34 includes instructions for extracting the first image from the images. The display control module 35 includes instructions for displaying the extracted first image on the screen of the LCD 17A.

The display control module 35 includes instructions for displaying the first image including the first area which is highlighted when the first character code includes the third character code, and displaying the first image including the second area which is highlighted when the second character code includes the third character code. Also, the display control module 35 includes instructions for displaying, when the first character code includes the third character code, and the second character code includes the third character code, the first image including either an intermediate area which is derived from the first area and the second area and is highlighted, or an area which includes the first area and the second area and is highlighted.

More specifically, the character recognition module 31 includes instructions for recognizing a character or characters in an image by using dictionary data 41 for each of the language environments output by the dictionary selection module 32. That is, the character recognition module 31 includes instructions for converting at least one character included in the image into at least one character code by using dictionary data 41 for one language environment, and repeatedly executing this conversion for each type of dictionary data 41. The character recognition module 31 includes instructions for extracting an area estimated to be a character from the image, for example, and calculating an image feature of that area. The character recognition module 31 includes instructions for calculating similarities between the calculated image feature and the respective features of characters (character codes) in dictionary data 41. The character recognition module 31 includes instructions for determining a character (a character code) having a feature with the greatest similarity from among those characters. In this way, the character in the image can be converted into text (character code).

Note that the character recognition module 31 may include instructions for determining character candidates (character code candidates) each having a feature with a high similarity from among those characters by using dictionary data 41 for character recognition. It is very likely that the determined character candidates and a character candidate rendered at a portion near those candidates in the image (on the left, right, top and bottom of the image, etc.) or a character recognized at a portion near those candidates in the image will constitute a character string having some meaning such as a word. Accordingly, the character recognition module 31 includes instructions for selecting a character candidate, which would constitute a word by a combination with a nearby character (or character candidate), from the character candidates by using dictionary data 41 for words and expression, thereby converting the character or characters in the image into text (a character code or character codes).

The storage process module 33 includes instructions for generating index data 42B by using the character recognition result as described above, and causing the database 42 to store the index data 42B. The storage process module 33 includes instructions for causing the nonvolatile memory 106, etc. to store, for example, a pair of at least one first character code and a first area in the image corresponding to the first character code by using the character recognition result obtained by using dictionary data 41 for the first language environment, and causing the nonvolatile memory 106, etc. to store a pair of at least one second character code and a second area in the image corresponding to the second character code by using the character recognition result obtained by using dictionary data 41 for the second language environment. Also, the storage process module 33 may include instructions for causing the database 42 to store data on the image including a character which has been recognized. The database 42 is stored in the nonvolatile memory 106 or a storage, etc., connected via a network.

Figure 4:
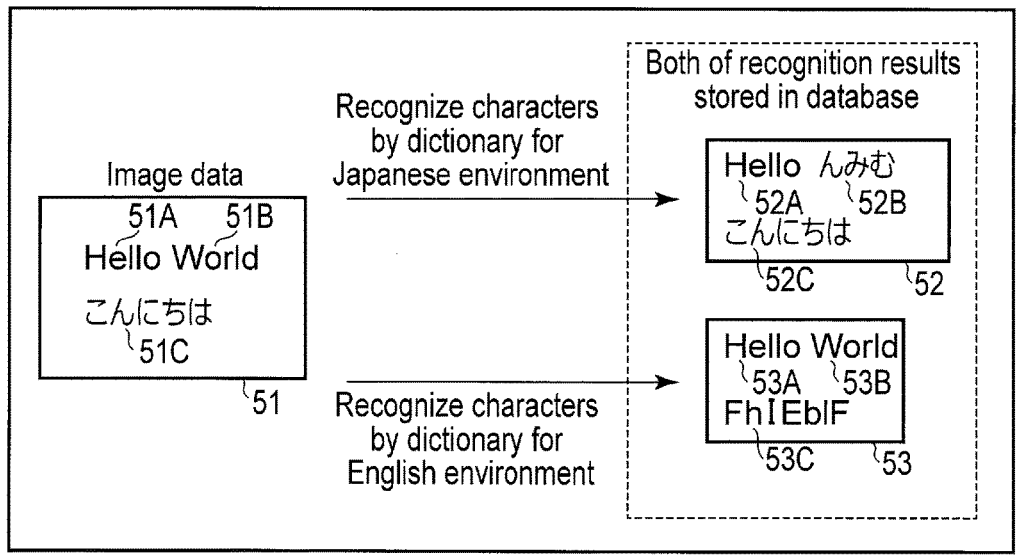
FIG. 4 is a view for describing an example in which characters in an image are recognized by using dictionary data for multiple language environments by the electronic apparatus of the embodiment.

Referring to FIG. 4, an example in which characters in an image are recognized by using items of dictionary data 41 for different kinds of language environments will be described. In an image 51 shown in FIG. 4, character string 51A and character string 51B constituted of English characters (letters in the alphabets), and character string 51C constituted of Japanese characters (hiragana) are rendered.

A recognition result 52 when the characters in the image 51 are recognized with dictionary data 41 for the Japanese environment is described below. The English character string 51A in the image 51 is correctly recognized as the English character codes 52A. The English character string 51B in the image 51 is incorrectly recognized as the Japanese character codes 52B. Further, the Japanese character string 51C in the image 51 is correctly recognized as the Japanese character codes 52C.

As described above, since dictionary data 41 for the Japanese environment includes entries corresponding to the alphabet, not only the Japanese character string 51C correctly recognized, but also a part of the English character strings, i.e., character string 51A in this case, can be correctly recognized.

Also, a recognition result 53 when the characters in the image 51 are recognized with dictionary data 41 for the English environment is described below. The English character string 51A in the image 51 is correctly recognized as the English character codes 53A. The English character string 51B in the image 51 is correctly recognized as the English character codes 53B. Further, the Japanese character string 510 in the image 51 is incorrectly recognized as the English character codes 53C.

Since no entry corresponding to the Japanese characters is included in dictionary data 41 for the English environment, while the English character strings 51A and 51B are correctly recognized, the Japanese character string 510 is incorrectly recognized as the English character codes 53C. As can be seen, when the language of the characters in the image 51 does not match the language of dictionary data 41, the recognition accuracy is decreased.

The storage process module 33 includes instructions for causing the database 42 to store character recognition results 52 and 53 obtained by using items of dictionary data 41 for these language environments as the index data 42B regardless of whether the recognition is correct or not. The index data 42B includes, for example, a pair of at least one recognized character and coordinates indicative of an area corresponding to the at least one character (for example, a rectangular area surrounding the at least one character).

FIG. 5 shows a configuration example of the index data 42B. The index data 42B includes at least one entry corresponding to at least one character (character code) for which at least one character in the image is recognized. An entry corresponding to a certain character includes, for example, items such as ID, Image ID, Dictionary, Character, and Area. The item ID indicates identification data imparted to that character. The item Image ID indicates identification data imparted to an image in which the character is recognized. Note that data such as a file name (a file path) of the image whereby the image can be identified may be used instead of Image ID. The item Dictionary indicates which dictionary data was used for the recognition of that character. Names of the language (language environment) such as Japanese and English are set for the item Dictionary. Note that for Dictionary, identification data (dictionary ID) imparted to each item of dictionary data may be set. The item Characters indicates that character (character code). The item Area indicates an area in the image in which the character is recognized, and represented by, for example, coordinates at an upper left end and coordinates at a lower right end of the rectangular area including the character.

An example of the index data 42B shown in FIG. 5 includes entries 71, 72, and 73 corresponding to recognition results 52A, 52B, and 53C, shown in FIG. 4, respectively, and entries 74, 75, and 76 corresponding to recognition results 53A, 53B, and 53C, respectively. Since a recognition process using dictionary data 41 for the Japanese environment, and a recognition process using dictionary data 41 for the English environment are carried out, character strings 51A, 51B, and 51C in the image are correctly recognized by at least one of the two recognition processes, and entries 71, 73, 74, and 75 based on the correctly-recognized character strings 52A, 52C, 53A, and 53B are created. In this way, the image can be searched with a keyword accurately.

Note that the index data 42B includes entries 72 and 76 of incorrectly recognized character strings 52B and 53C. However, since the likelihood of such incorrectly recognized character strings 52B and 53C being input as a keyword is slim, even if entries 72 and 76 of character strings 52B and 53C are stored in the database 42, those entries are unlikely to affect the search accuracy.

The search control module 34 includes instructions for searching for, when a query (may also be hereinafter referred to as a keyword) is input by the user, a character (or characters) in the image corresponding to the input keyword by using the index data 42B stored in the database 42. The query is at least one character code (a third character code) input by, for example, the user by using a software keyboard or a keyboard. The search control module 34 includes instructions for determining an image including the character (or characters) that matches with the keyword by performing a full-text search of, for example, the data in the item Characters in the index data 42B by the input keyword.

Figure 6:
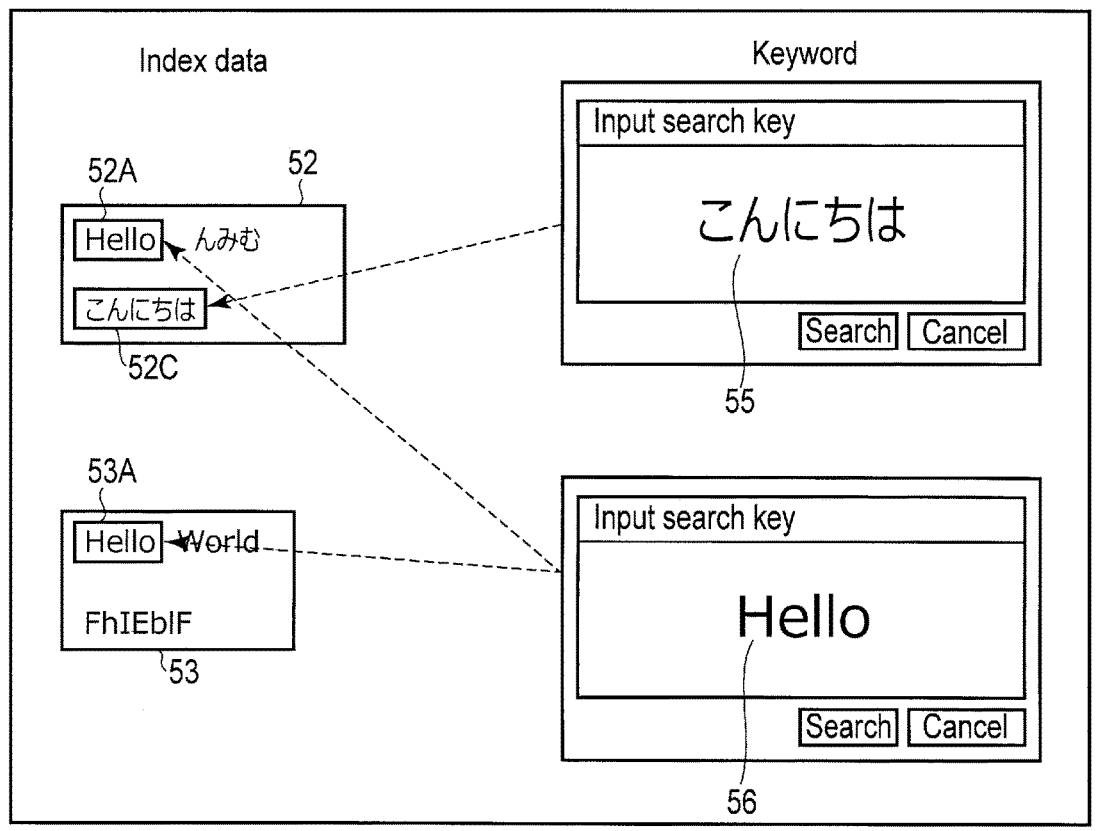
FIG. 6 is a view for describing an example in which a keyword search is performed by using the index data by the electronic apparatus of the embodiment.

FIG. 6 shows an example in which the database 42 is searched by a keyword (a character codes) input by the user. In the following, it is assumed that entries 71 to 76 shown in FIG. 5 are included in the index data 42B.

Figure 7:
FIG. 7 is a view showing an example of a search result displayed by the electronic apparatus of the embodiment.

First, a case where the user inputs character string (character codes) 55 will be described. An entry 73 of character string 52C which matches with this character string 55 is extracted from among entries 71 to 76 of the index data 42B. The image data 42A is read based on a value indicated in the item Image ID of the extracted entry 73. Further, as shown in FIG. 7, the coordinates indicated in the item area of the extracted entry 73 are used and a highlight process is performed for a rectangular area 511 corresponding to character string 52C. Then, the image 51 including the highlighted area 511 is displayed on screen.

Next, a case where the user inputs character string 56, i.e., "Hello", will be described. An entry 71 of character string 52A and an entry 74 of character string 53A which match character string 56 are extracted from among entries 71 to 76 of the index data 42B. The image data 42A is read based on a value indicated in the item Image ID of each of the extracted entries 71 and 74.

Figure 8:
FIG. 8 is a view showing another example of a search result displayed by the electronic apparatus of the embodiment.

The areas represented by the two entries 71 and 74 in a case where the extracted two entries 71 and 74 include the same Image ID value, and the areas represented by the two entries 71 and 74 can be estimated to be those surrounding the same character string are merged. Since the area surrounding character string 52A and the area surrounding character string 53A can be estimated to be those having most of their parts overlapped and surrounding the same character string, the area 512 in which the area surrounding character string 52A and the area surrounding character string 53A are merged is calculated. Further, a highlight process is performed for the merged area 512, as shown in FIG. 8, and the image 51 including the highlighted area 512 is displayed on screen. The highlight is, for example, drawing a frame corresponding to area 511, changing the background color of area 511, and the like. In this way, a portion that matches with the input character string 55 can be presented to the user to be easily seen.

As described above, dictionary data 41 for the Japanese environment includes not only entries corresponding to hiragana, katakana, kanji, numerical characters and symbols, but also entries corresponding to the other language such as the alphabet. Also, dictionary data 41 for the English environment includes entries corresponding to letters in the alphabets, numerals, and symbols. Accordingly, an alphabetical character string in the image, for example, may be correctly recognized in both the character recognition process using dictionary data 41 for the Japanese environment and the character recognition process using dictionary data 41 for the English environment.

However, dictionary data for character recognition, that is, features of characters defined by these items of dictionary data may be different in dictionary data 41 for the Japanese environment and dictionary data 41 for the English environment. Accordingly, there is a possibility that areas surrounding the character (the characters) in the recognized image will be different according to the recognition result obtained by the two types of dictionary data 41.

Figure 9:
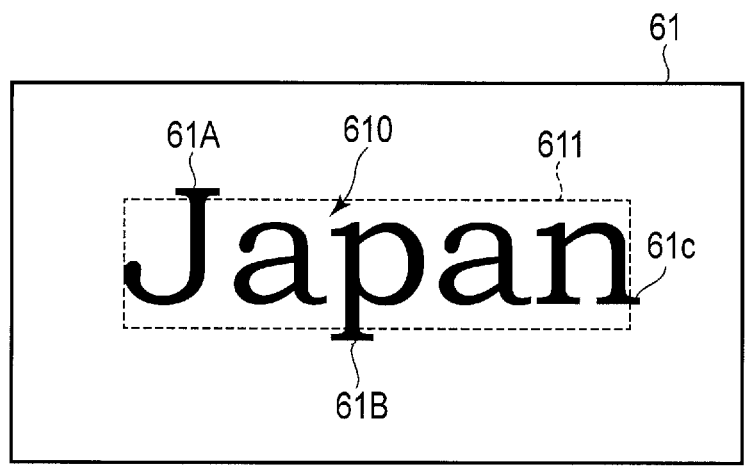
FIG. 9 is a view showing an example of an area corresponding to characters recognized by the electronic apparatus of the embodiment.
Figure 10:
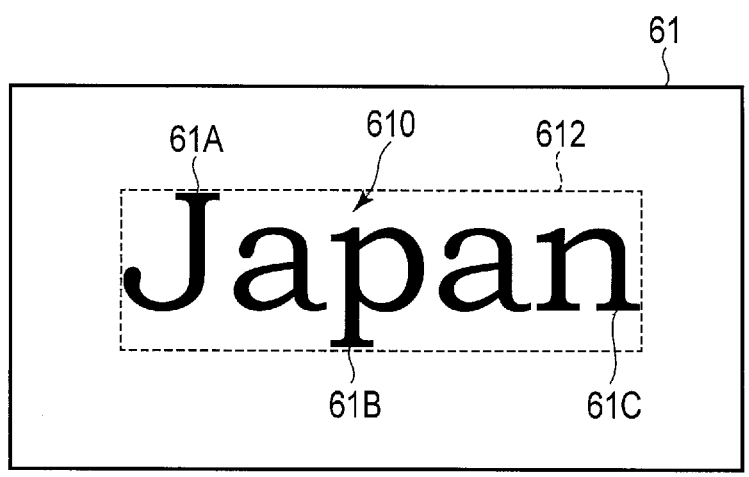
FIG. 10 is an illustration showing another example of an area corresponding to characters recognized by the electronic apparatus of the embodiment.

FIGS. 9 and 10 show examples of a result of the character recognition process using dictionary data 41 for two types of language environment.

In the example shown in FIG. 9, since elements 61A, 61B, and 61C, which decorate the characters, are not recognized as parts of the characters, those elements 61A, 61B, and 61C are not included in area 611 surrounding the recognized character string 610. Meanwhile, in the example shown in FIG. 10, since elements 61A, 61B, and 61C, which decorate the characters, are recognized as parts of the characters, those elements 61A, 61B, and 610 are included in area 612 surrounding the recognized character string 610. This difference is brought by the fact that while dictionary data 41 used in the example shown in FIG. 9 defines character features considering a font that does not include elements which decorate characters (for example, Gothic), dictionary data 41 used in the example shown in FIG. 10 defines character features considering a font that includes elements which decorate characters (for example, Times New Roman).

Further, when these two character recognition results are stored in the database 42 as the index data 42B, and the database 42 is searched by a keyword (here, "Japan"), two entries (hereinafter referred to as a first entry and a second entry) in which the keyword is set for the character string data are extracted from entries in the index data 42B. These two entries both correspond to character string 610, i.e., "Japan", recognized from an image 61.

When such two entries are extracted, and a highlight process is performed for each of the corresponding two areas 611 and 612 in the image 61, two highlighted areas 611 and 612 are displayed for one character string 610. Accordingly, since frames of two rectangular areas 611 and 612 shifted from each other by several pixels are rendered to surround one character string 610, for example, the user may feel that the characters are hard to see.

For this reason, such two areas 611 and 612 are merged. More specifically, when the two entries extracted by the search are those including the value of the same image ID, it is determined whether a first area 611 based on the value of Area in the first entry, and a second area 612 based on the value of Area in the second entry overlap one another.

When the two areas 611 and 612 overlap one another, the ratio of the overlapping area to the average area of the first area 611 and the second area 612 is calculated. In the first area 611 and the second area 612, the greater the calculated ratio is, the higher the possibility of those areas corresponding to the same character. Accordingly, those areas should preferably be merged. Thus, when the calculated ratio is greater than a threshold, the first area 611 and the second area 612 are merged. The threshold is set to, for example, 0.9. That is, when the area of the overlapping area of the first area 611 and the second area 612 takes up 90% or more of the average area of the first area 611 and the second area 612, the first area 611 and the second area 612 are merged. For example, an area which is an intermediate of these two areas 611 and 612, or an area including these two areas 611 and 612 is calculated in order to merge the two areas.

In the examples shown in FIGS. 9 and 10, since the second area 612 includes the first area 611, for example, the second area 612 is output as a result of the merge. The image 61 for which a highlight process is performed for the second area 612 is displayed on screen based on the result of the merge.

Note that even if the first area 611 and the second area 612 correspond to the same area (coordinates), if the highlight process is performed twice for the same areas 611 and 612, the image 61 to be displayed may become hard to see because of the dense highlight, for example. Accordingly, even if areas 611 and 612 represent the same area, the areas 611 and 612 may be merged.

Next, referring to the flowchart of FIG. 11, an example of the procedure of the character recognition process executed by the tablet computer 10 will be described. As described above, the CPU 101 in the tablet computer 10 executes the instructions included in the digital notebook application program 202.

First, data on an image including characters is read (block B11). The characters in the image may include characters of languages, for example, hiragana for Japanese characters and the alphabet for English characters.

Next, the dictionary data 41 for recognizing a character in the image is selected (block B12). The character in the image is recognized by using the selected dictionary data 41 (block B13). The dictionary data 41 includes entries each including a character and a feature of that character. For example, the character in the image is recognized by extracting an area estimated to include the character in the image, calculating the feature in that area, and determining a character having a feature with the greatest similarity to the calculated feature by using the dictionary data 41.

The index data 42B is generated by using the recognition result, and is stored in the database 42 (block B14). The configuration of the index data 42B is described above with reference to FIG. 5.

Next, it is determined whether there is another type of dictionary data 41 for recognizing the character in the image (block B12). If another type of dictionary data 41 is available (Yes in block B15), the process returns to block B12, and the character recognition process using another type of dictionary data 41 is continued. Further, if another type of dictionary data 41 does not exist (No in block B15), the process is finished.

The flowchart of FIG. 12 shows an example of the procedure of a search process executed by the tablet computer 10. The search process is a process of searching the database 42, which is constructed by the character recognition process, by a keyword (a character string) input by the user.

First, it is determined whether a keyword is input (block B21). The user inputs the character string, which serves as the keyword for the search, by using the software keyboard displayed on the screen of the tablet computer 10, or a keyboard (not shown) connected to the tablet computer 10 with or without wires. If no keyword is input (No in block B21), the process returns to block B21, and whether or not a keyword is input is determined again.

When a keyword is input (Yes in block B21), one or more entries each including a character (characters) corresponding to the keyword are extracted from the index data 42B in the database 42 (block B22). The image data 42A corresponding to Image ID in each of the extracted entries is read from the database 42 (block B23). Further, it is determined whether entries including the same image ID are found in the extracted entries (block B24). If entries including the same image ID are found (Yes in block B24), a merge process is executed for displaying a result of the search appropriately (block B25). Details of the procedure of the merge process will be described later with reference to FIG. 13. Further, an area in the image corresponding to the keyword is highlighted by using a result of the merge (block B26).

When entries including the same image ID are not found (No in block B24), an area in the image corresponding to the keyword is highlighted based on an area indicated by the extracted entry (block B27).

Further, the image (a list of images) in which the area corresponding to the keyword is highlighted is displayed on the screen of the LCD 17A (block B28).

Referring to the flowchart of FIG. 13, an example of the procedure of the merge process executed by the tablet computer 10 will be described.

First, it is determined whether a first area and a second area, which are indicated by the two entries (a first entry and a second entry) including the same image ID, are overlapping (block B31). It is determined whether a first rectangular area based on coordinate information of the item Area in the first entry and a second rectangular area based on coordinate information of the item Area in the second entry are overlapping. When the two areas do not overlap one another (No in block B31), the merge process is finished.

Meanwhile, when the two areas overlap one another (Yes in block B31), the ratio of the overlapping area to the average area of the first area and the second area is calculated (block B32). In the first area and the second area, the greater the calculated ratio is, the higher the possibility of those areas corresponding to the same character. Accordingly, those areas should preferably be merged. For this reason, it is determined whether the calculated ratio is greater than a threshold (block B33). Further, when the calculated ratio is greater than the threshold (Yes in block B33), the first area and the second area are merged (block B34).

Note that while a case of recognizing a character in the image has been described in the above example, it is also possible to recognize a character from a handwritten document including at least one stroke input by handwriting on the touchscreen display 17. A stroke input by handwriting is stored in a storage medium as time-series data indicating a coordinate string of a path of each stroke and the order of strokes, not as the image data. The time-series data includes at least one item of stroke data corresponding to at least one stroke. Each item of stroke data corresponds to one stroke, and includes a coordinate data series (time-series coordinates) corresponding to respective points on the stroke. The order of arrangement of these items of stroke data corresponds to the order in which the respective strokes were handwritten, that is, a stroke order.

Dictionary data 41 may include character recognition dictionary data for recognizing characters from such stroke data (a handwritten document). The character recognition dictionary data includes, for example, entries each including a character and a feature of one or more strokes which constitute the character.

For example, the feature is calculated by using the stroke data of the input stroke or strokes, and a character having a feature of the largest similarity to the calculated feature is determined by using dictionary data (character recognition dictionary data) 41. In this way, the stroke data can be converted into text (a character code).

Index data 42B is created by using the character recognition result as described above, and the index data 42B is stored in the database 42. The index data 42B includes, for example, a pair of at least one recognized character and coordinates indicative of an area in the handwritten document corresponding to that character (for example, a rectangular area including a stroke corresponding to the character).

As in the case of searching for a character in the image described above, a character in the handwritten document corresponding to the input keyword is searched for by using the index data 42B stored in the database 42.

Further, a keyword for the search may be input by handwriting. In that case, after the keyword (the stroke) input by handwriting is converted into a character code or character codes, characters in the image or characters in the handwritten document are searched by using the character code or character codes.

Also, in the example described above, a case where dictionary data 41 for the Japanese environment and dictionary data 41 for the English environment are used has mainly been described. However, it is possible to recognize a character in the image also by dictionary data 41 for another language environment, and search by a keyword by using the recognition result. In addition, dictionary data 41 adaptable for a language environment which differs according to country or region with respect to a language categorized as being the same may also be used.

As described above, according to the present embodiment, an image including characters of a plurality of languages can be searched by a keyword. The nonvolatile memory 106 stores images. In the images, characters of languages are rendered. The CPU 101 converts at least one first character in a first image of the images, into at least one first character code by using dictionary data 41 for a first language environment, and converts the at least one first character into at least one second character code by using dictionary data 41 for a second language environment. The CPU 101 causes the nonvolatile memory 106 (database 42) to store a pair of the at least one first character code and a first area in the first image corresponding to the at least one first character code, and causes the nonvolatile memory 106 (database 42) to store a pair of the at least one second character code and a second area in the first image corresponding to the at least one second character code.

In this way, regardless of the language of the character in the image, the character in the image can be recognized, and the index data 42B, which is a pair of a character code based on the recognition result and an area is generated. Further, by using this index data 42B, a search can be made in an image including characters of multiple languages by the keyword input by the user.

Note that the process procedure of the present embodiment described with reference to the flowcharts of FIGS. 11 to 13 can all be executed by software. Accordingly, it is possible to easily realize an advantage similar to that of the present embodiment by simply installing a program for executing these process steps on an ordinary computer by way of a computer-readable storage medium having stored thereon the program, and executing this program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a memory configured to store first dictionary data and second dictionary data, the first dictionary data used for recognizing characters of a first language, the second dictionary data used for recognizing characters of a second language different from the first language;
   a database configured to store items of image data comprising a first item of image data, wherein at least characters of the first language and characters of the second language are rendered in each of the items of image data; and
   a hardware processor configured to:
   read the first item of image data from the database, recognize at least first characters in the first item of image data by using the first dictionary data, and generate first character codes corresponding to the recognized first characters;
   store first index data to the database, the first index data indicative of the first character codes, a first area and the first item of image data associated with the first character codes;
   recognize at least second characters in the first item of image data by using the second dictionary data, and generate second character codes corresponding to the recognized second characters;
   store second index data to the database, the second index data indicative of the second character codes, a second area and the first item of image data associated with the second character codes; and
   search the database comprising the first index data and the second index data when inputting a keyword, and
   when the keyword corresponds to the first character codes or the second character codes, read the first item of image data that corresponds to the first character codes or the second character codes from the database, and
   when both the first character codes and the second character codes comprise the keyword, determine a ratio of an overlap area between the first area and the second area to an average area of the first area and the second area, when the ratio is greater than a threshold, generate a merge area of the first area and the second area and display the first item of image data comprising the merge area as highlighted.

2. The electronic apparatus of claim 1, wherein
   the first index data comprises the first character codes and coordinates of the first area in the first item of image data, the first area corresponding to a position of the first character codes, and
   the second index data comprises the second character codes and coordinates of the second area in the first item of image data, the second area corresponding to a position of the second character codes.

3. The electronic apparatus of claim 2,
   wherein the hardware processor is further configured to display the first item of image data as a search result when the first character codes comprise the keyword, wherein the displayed first item of image data comprises the first area which is highlighted.

4. The electronic apparatus of claim 2, wherein the hardware processor is configured to
   display the first item of image data as a search result when the second character codes comprise the keyword, wherein the displayed first item of image data comprises the second area which is highlighted.

5. The electronic apparatus of claim 4, wherein the hardware processor is configured to calculate, as the merge area, either an intermediate area of the first area and the second area or an area including the first area and the second area.

6. A method comprising:
   reading a first item of image data from among items of image data stored in a database, wherein at least characters of a first language and characters of a second language different from the first language are rendered in each of the items of image data;
   recognizing at least first characters in the first item of image data by using first dictionary data used for recognizing characters of a first language, and generating first character codes corresponding to the recognized first characters;
   storing first index data to the database, the first index data indicative of the first character codes and the first item of image data associated with the first character codes;
   recognizing at least second characters in the first item of image data by using second dictionary data used for recognizing characters of a second language, and generating second character codes corresponding to the recognized second characters;
   storing second index data to the database, the second index data indicative of the second character codes and the first item of image data associated with the second character codes;

searching the database comprising the first index data and the second index data when inputting a keyword; and reading, when the keyword corresponds to the first character codes or the second character codes, the first item of image data that corresponds to the first character codes or the second character codes from the database.

7. A computer-readable, non-transitory storage medium having stored thereon a program which is executable by a computer, the program controlling the computer to execute functions of:

reading a first item of image data from among items of image data stored in a database, wherein at least characters of a first language and characters of a second language different from the first language are rendered in each of the items of image data;

recognizing at least first characters in the first item of image data by using first dictionary data used for recognizing characters of a first language;

generating first character codes corresponding to the recognized first characters;

storing first index data to the database, the first index data indicative of the first character codes and the first item of image data associated with the first character codes;

recognizing at least second characters in the first item of image data by using second dictionary data used for recognizing characters of a second language;

generating second character codes corresponding to the recognized second characters;

storing second index data to the database, the second index data indicative of the second character codes and the first item of image data associated with the second character codes;

searching the database comprising the first index data and the second index data when inputting a keyword; and reading, when the keyword corresponds to the first character codes or the second character codes, the first item of image data that corresponds to the first character codes or the second character codes from the database.

* * * * *